United States Patent
Kim et al.

(10) Patent No.: US 10,469,462 B2
(45) Date of Patent: Nov. 5, 2019

(54) APPARATUS AND METHOD FOR MANAGING VIRTUAL SUBSCRIBER INDENTITY MODULE

(71) Applicant: SAMSUNG ELECTRONICS CO., LTD., Suwon-si, Gyeonggi-do (KR)

(72) Inventors: Soh Mann Kim, Yongin-si (KR); Sie Joon Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 80 days.

(21) Appl. No.: 15/582,956

(22) Filed: May 1, 2017

(65) Prior Publication Data
US 2017/0317990 A1   Nov. 2, 2017

(30) Foreign Application Priority Data
May 2, 2016   (KR) .................. 10-2016-0054158

(51) Int. Cl.
| | |
|---|---|
| *H04L 29/06* | (2006.01) |
| *H04L 9/32* | (2006.01) |
| *H04W 12/02* | (2009.01) |
| *H04W 12/06* | (2009.01) |
| *H04W 4/60* | (2018.01) |
| *H04L 9/08* | (2006.01) |

(52) U.S. Cl.
CPC ........ *H04L 63/0435* (2013.01); *H04L 9/0825* (2013.01); *H04L 9/0897* (2013.01); *H04L 9/3265* (2013.01); *H04L 63/0823* (2013.01); *H04W 4/60* (2018.02); *H04W 12/02* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,909,919 B2 * | 12/2014 | Yu ...................... | H04N 21/4181 713/156 |
| 9,020,479 B1 * | 4/2015 | Somayajula .......... | H04W 48/18 455/418 |
| 9,510,185 B2 | 11/2016 | Xiong | |
| 9,532,219 B2 | 12/2016 | Schell et al. | |
| 10,237,722 B2 * | 3/2019 | Chen ..................... | H04W 76/18 |
| 2010/0050271 A1 * | 2/2010 | Saarisalo ................ | G06F 21/50 726/28 |

(Continued)

*Primary Examiner* — Christopher A Revak
(74) *Attorney, Agent, or Firm* — Nixon & Vanderhye P.C.

(57) ABSTRACT

An electronic device is provided. The electronic device includes at least one processor that is configured to execute a first application in an REE, to execute a second application in a TEE, and to execute an agent that performs data transmission between the first application and the second application, a communication circuit configured to communicate with a server, and a secure memory area that is accessible by the TEE. The at least one processor is configured to obtain a random value from the server, to transmit a response message including the random value to the server through the communication circuit, to receive encrypted SIM data from the server, to obtain a SIM profile from the encrypted SIM data using a private key corresponding to the public key, and to store the obtained SIM profile in the secure memory area.

15 Claims, 9 Drawing Sheets

(56) References Cited

U.S. PATENT DOCUMENTS

| | | | |
|---|---|---|---|
| 2012/0170745 A1* | 7/2012 | Bai | H04L 9/0866 380/270 |
| 2012/0190354 A1* | 7/2012 | Merrien | H04W 4/70 455/422.1 |
| 2015/0074780 A1 | 3/2015 | Schell et al. | |
| 2015/0099562 A1 | 4/2015 | Xiong | |
| 2015/0126153 A1* | 5/2015 | Spitz | H04M 1/675 455/411 |
| 2015/0181422 A1* | 6/2015 | Rombouts | H04L 9/3271 380/270 |
| 2015/0208239 A1* | 7/2015 | Bai | H04W 12/06 455/411 |

* cited by examiner

APPARATUS AND METHOD FOR MANAGING VIRTUAL SUBSCRIBER INDENTITY MODULE

CROSS-REFERENCE TO RELATED APPLICATION

This application is based on and claims priority under 35 U.S.C. § 119 to a Korean patent application filed on May 2, 2016 in the Korean Intellectual Property Office and assigned Serial number 10-2016-0054158, the disclosure of which is incorporated by reference herein in its entirety.

TECHNICAL FIELD

The present disclosure relates generally to a technology for safely storing subscriber identification information in a wireless communication device.

BACKGROUND

An electronic device that uses a network provided by a mobile network operator (MNO) has to contain information for identifying and authenticating a user. For example, the electronic device has to contain information such as international mobile subscriber identity (IMSI). The IMSI that is a unique value in all cellular networks may include, for example, mobile country code (MCC), mobile network code (MNC), and mobile subscription identification number (MSIN) information. For example, in the case where "123456789" is allocated as the MSIN value in the AT&T operator (MNC=150) of the USA (MCC=310), the IMSI of the user may be "310150123456789". In the case where "13511078690" is allocated as the MSIN value in the CMCC operator (MNC=00) of the CHINA (MCC=460), the IMSI of the user may be "4600013511078690".

Information necessary for identification/authentication, such as the IMSI, may be mounted in a universal integrated circuit card (UICC), such as a subscriber identity module (SIM) card or a universal SIM (USIM) card, or an embedded UICC such as an embedded secure element (eSE). Also, the above-described manners may be mixed with each other. For example, the electronic device may include a detachable UICC of a hardware manner and may simultaneously have a SIM that is stored in the eSE or is installed in a software manner in a secure area. In this case, the electronic device may activate one of the installed SIM and the detachable UICC or two (or more) SIMs to communicate with a network.

For the electronic device to use the SIM of the software manner, the electronic device has to receive SIM data through the network. Since the IMSI value or the like for identification of the user is included in the SIM data, various issues occur if the IMSI value is leaked in a communication process or is not safely stored in the secure area of the electronic device. Since data usage is aggregated or charged on the basis of the IMSI value, the user may suffer serious damage when the SIM data are leaked.

SUMMARY

Various example aspects of the present disclosure address at least the above-mentioned problems and/or disadvantages and to provide at least the advantages described below. Accordingly, an example aspect of the present disclosure is to provide a method of safely receiving and storing SIM data through a network.

In accordance with an example aspect of the present disclosure, an electronic device that supports a rich execution environment (REE) and a trusted execution environment (IEE) independent of the REE may include at least one processor configured to execute a first application in the REE, to execute a second application in the TEE, and to execute an agent that performs data transmission between the first application and the second application, a communication circuit configured to communicate with a server, and a secure memory area configured to be accessible by the TEE. The at least one processor may be configured to obtain a random value from the server in response to transmission of a SIM order message through the first application, may be configured to transmit a response message, which includes the random value and a public key generated by the second application, to the server through the communication circuit, may be configured to obtain encrypted SIM data from the server, may be configured to obtain a SIM profile from the encrypted SIM data using a private key that is generated by the second application and corresponds to the public key, and may be configured to store the obtained SIM profile in the secure memory area.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
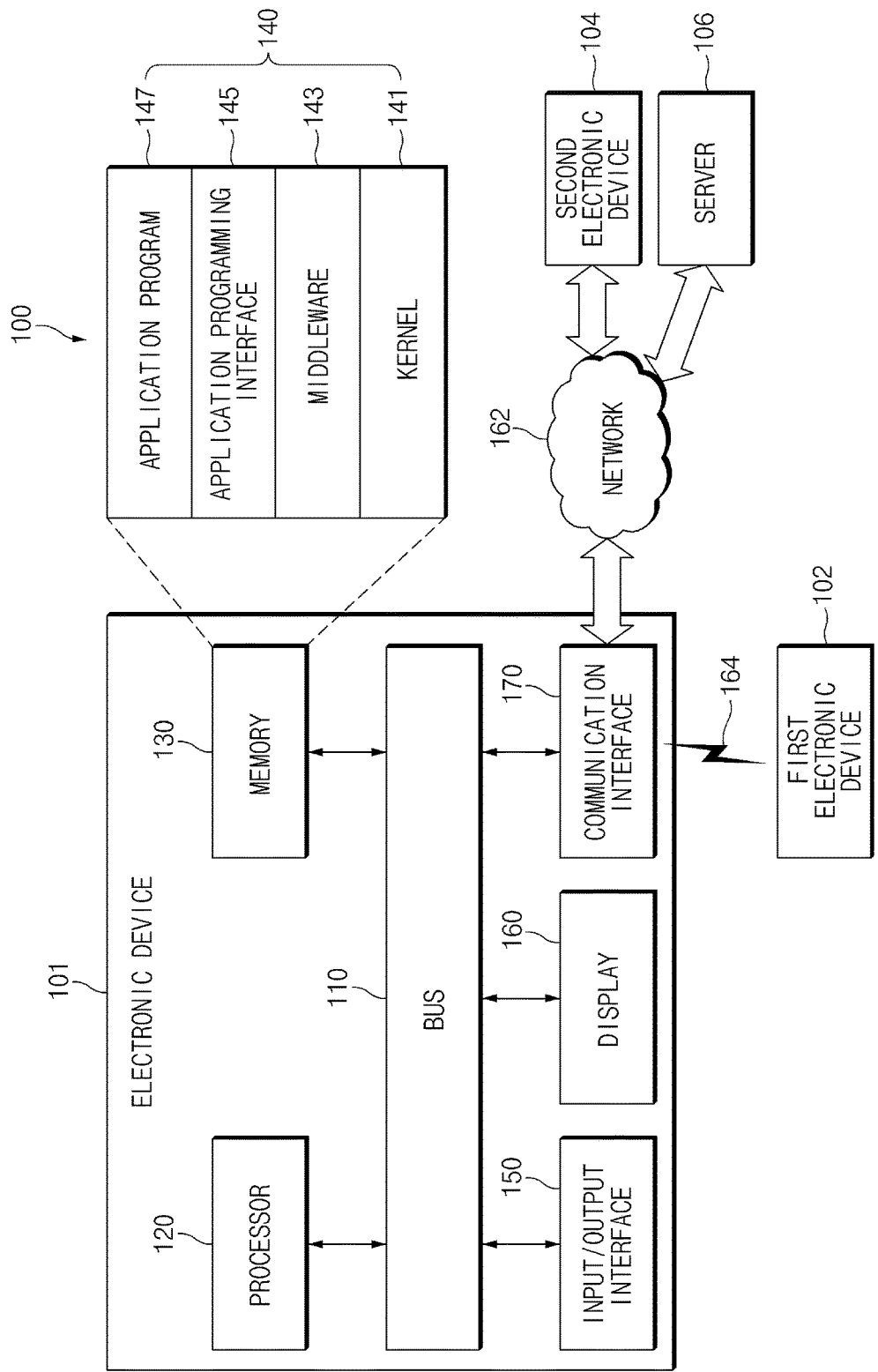
FIG. 1 is a diagram illustrating an example electronic device in an example network environment, according to an example embodiment.

Hereinafter, various example embodiments of the present disclosure may be described with reference to accompanying drawings. Accordingly, those of ordinary skill in the art will recognize that modification, equivalent, and/or alternative of the various example embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not refer only to "specifically designed to" in hardware. Instead, the expression "a device configured to" may refer to a situation in which the device is "capable of" operating together with another device or other components. For example, a "processor configured to (or set to) perform A, B, and C" may refer, for example, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various example embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. According to various example embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a diagram illustrating an example electronic device in an example network environment system, according to an example embodiment.

Referring to FIG. 1, an electronic device 101, a first electronic device 102, a second electronic device 104, or a server 106 may be connected each other over a network 162 or a short range communication 164. The electronic device 101 may include a bus 110, a processor (e.g., including processing circuitry) 120, a memory 130, an input/output interface (e.g., including interface circuitry) 150, a display 160, and a communication interface (e.g., including communication circuitry) 170. According to an embodiment, the electronic device 101 may not include at least one of the above-described elements or may further include other element(s).

The bus 110 may interconnect the above-described elements 110 to 170 and may include a circuit for conveying communications (e.g., a control message and/or data) among the above-described elements.

The processor 120 may include various processing circuitry, such as, for example, and without limitation, one or more of a dedicated processor, a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may include various interface circuitry and may play a role, for example, of an interface which transmits an instruction or data input from a user or another external device, to other element(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display, or the like, but is not limited thereto. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may include various communication circuitry and may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of a wireless fidelity (Wi-Fi), a Bluetooth, a near field communication (NFC), a magnetic stripe transmission (MST), or the like.

Each of the first and second electronic devices 102 and 104 may be a device of which the type is different from or the same as that of the electronic device 101. According to an embodiment, the server 106 may include a group of one or more servers. According to an embodiment, all or a portion of operations that the electronic device 101 will perform may be executed by another or plural electronic devices (e.g., the first electronic device 102, the second electronic device 104 or the server 106). In the case where the electronic device 101 executes any function or service automatically or in response to a request, the electronic device 101 may not perform the function or the service internally, but, alternatively additionally, it may request at least a portion of a function associated with the electronic device 101 at other device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
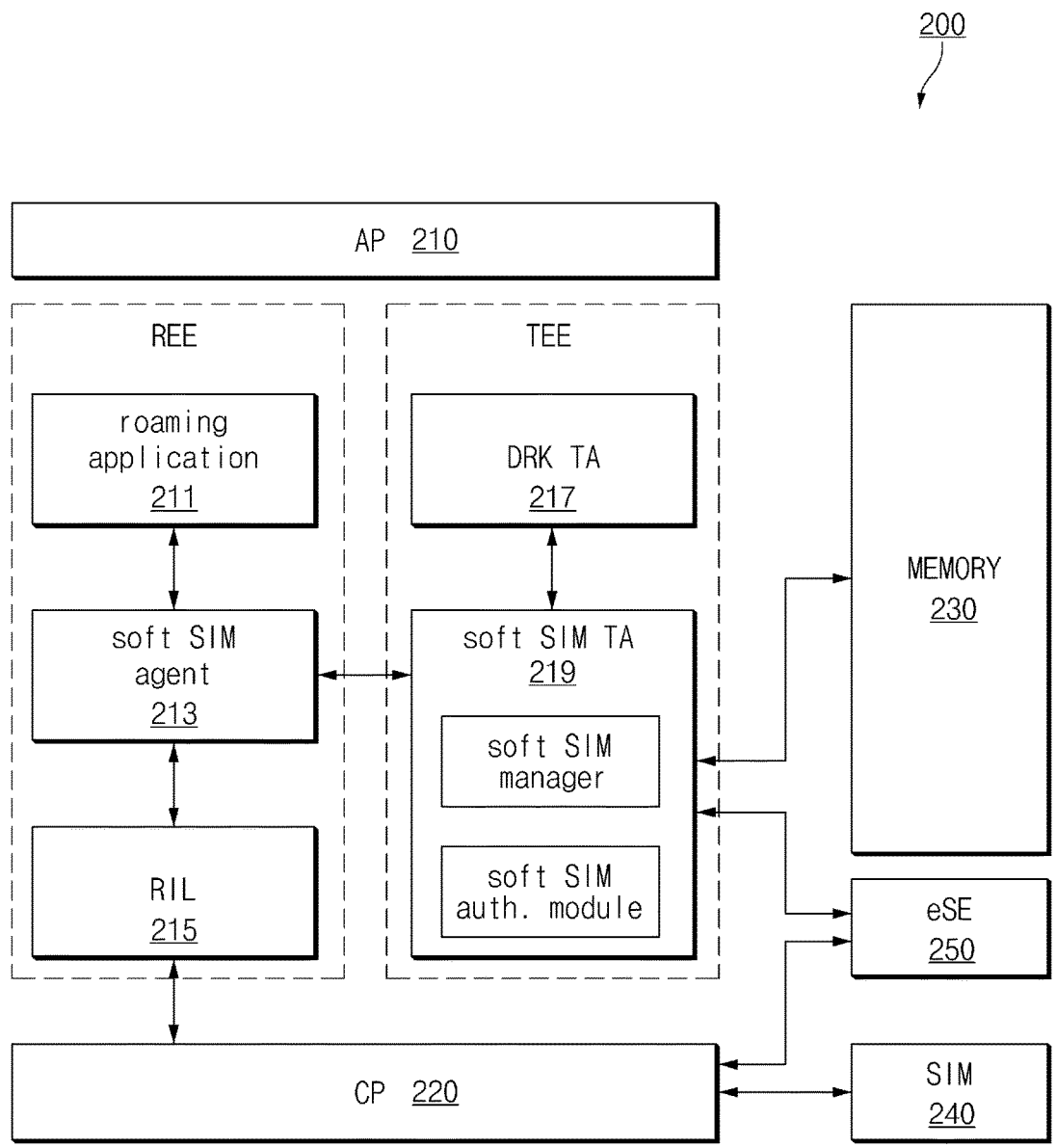
FIG. 2 is a diagram illustrating an example hardware/software module of the electronic device, according to an example embodiment.

FIG. 2 is a diagram illustrating an example hardware/software module of an electronic device, according to an example embodiment.

An electronic device 200 of FIG. 2 may be understood as an example of the electronic device 101 of FIG. 1. Accordingly, the description associated with the electronic device 101 of FIG. 1 may be applied to the electronic device 200 of FIG. 2.

In this disclosure, a virtual SIM may refer, for example, to a software SIM installed in a storage space (e.g., a memory 230, an eSE 250, or the like) of the electronic device 200, not a physical hardware SIM. Accordingly, the virtual SIM may be referred to as a "soft(ware) SIM".

The electronic device 200 may, for example, and without limitation, be a mobile device that a user utilizes. For convenience of description, electronic device 200 may be referred to as a "mobile device", a "mobile terminal", "user equipment (UE)", or the like.

The electronic device 200 may include an AP (e.g., including processing circuitry) 210, a CP (e.g., including processing circuitry) 220, and the memory 230. Also, the electronic device 200 may selectively include a detachable SIM 240 and/or the eSE 250. In an embodiment, in the case where the electronic device 200 communicates with a network based on IMSI information included in the detachable SIM 240 or IMSI information included in the eSE 250, the CP 220 may directly access the SIM 240 or the eSE 250. In the case where the electronic device 200 communicates with the network based on IMSI information stored in the memory 230, the CP 220 may obtain information from the memory 230 through the AP 210.

The AP 210 may include various processing circuitry and perform a function of controlling elements of the electronic device 200. The AP 210 may be generally referred to as a "processor" or "at least one processor". In an embodiment, the AP 210 may support a trusted execution environment (TEE) and a rich execution environment (REE), which are independent of each other, as in the ARM® TrustZone® technology. For example, in the TrustZone®, the TEE is called a "secure world", and the REE is called a "normal world". The TEE/REE may be referred as a different name such as a secure mode/normal mode or a secure operating environment/normal operating environment.

The TEE provides a high-level security and blocks or restrictedly permits an access of an application that is not executed. For example, when a payment application executed in the REE intends to pay, the payment application may make a request to the TEE for authentication, and an authentication application executed in the TEE may obtain authentication information such as a user fingerprint, may compare the authentication information with data stored in the secure memory area, and may provide the payment application being executed in the REE with a result value only indicating authentication success/fail.

The AP 210 may drive a roaming application 211, a soft SIM agent 213, and a radio interface layer (RIL) 215 in the REE. Besides, the AP 210 may drive various applications, an application framework, various kinds of managers, an operating system, and the like.

The roaming application 211 may provide a service and settings associated with a communication function of the electronic device 200. For example, the roaming application 211 may provide a user interface for controlling order, payment, activation, status indication, and the like of the soft SIM. Also, the roaming application 211 may control a soft SIM trusted application (TA) 219 by using an API that the soft SIM agent 213 provides. A soft SIM control command transmitted to the soft SIM TA 219 may include setting of a new SIM profile, removing of an existing SIM profile, displaying of a SIM profile, activating of a SIM profile, and the like. For example, the soft SIM control command may be transmitted from the soft SIM agent 213 to the soft SIM TA 219 by a client library.

In an embodiment when the user wants to use the electronic device 200, which the user buys in the first country, in the second country, the user may execute the roaming application 211 to perform roaming setting. Also, the user may execute the roaming application 211 and may order a roaming service product that is usable in the second country.

If the roaming service product is ordered in the electronic device 200, the electronic device 200 may receive a SIM profile corresponding to the roaming service product from a server and may store the SIM profile in the memory 230 or the eSE 250. Information for identifying and authenticating the user, such as IMSI, may be included in the SIM profile. Accordingly, the process of downloading and storing the SIM profile may be mainly performed in the IEE. An example associated with this will be described with reference to FIG. 3.

The soft SIM agent 213 may provide a communication interface between a trusted application (TA) operating in the TEE and the RIL 215. For example, the soft SIM agent 213 may make a request to the TEE for information corresponding to an event that occurs in the roaming application 211. For example, in the case where there occurs an event in which a first SIM currently activated in the roaming application 211 is replaced with a second SIM, the soft SIM agent 213 may make a request to the soft SIM TA 219 operating in the TEE for authentication information for performing authentication on a network corresponding to the second SIM. For example, the authentication information may include a subscriber key (Ki), operator constant (OPc), an IMSI value, and the like, which correspond to the second SIM, and a random value provided from a CP. Additionally, the authentication information may further include a byproduct that the soft SIM TA 219 generates using an authentication algorithm.

If authentication information is received from the TEE, the soft SIM agent 213 may provide the received authentication information to the CP 220 through the RIL 215. The TEE and CP 210 may exchange data with each other through a secure channel. For example, an application protocol data unit (APDU) message that is exchanged between the soft SIM TA 219 and the CP 220 may be transmitted through the secure channel between the AP 210 and the CP 220. For example, the AP 210 and the CP 220 may exchange encryption keys with each other at a booting time point of the electronic device 200 and may encrypt/decrypt the APDU by using the exchanged encryption keys.

The AP 210 may drive a device root key trusted application (DRK TA) 217 and the soft SIM TA 219 in the TEE. The DRK TA 217 may generate a public key and private key pair to be used in the soft SIM TA 219 by using an encryption algorithm such as a public key encryption algorithm. Also, the DRK TA 217 may generate a DRK certificate including a DRK public key and may manage the DRK private key. The soft SIM TA 219 may process management and authentication of a SIM profile. A detailed operation of each TA will be described with reference to FIGS. 3 to 5. Besides, the AP 210 may drive various applications, an application framework, various kinds of managers, a (secure) operating system, and the like in the TEE.

The above-described DRK TA 217 or soft SIM TA 219 may be an example of a TA and may be implemented with a plurality of applications or one unified application based on a to-be-executed function. For example, the DRK TA 217 and the soft SIM TA 219 may be implemented with one application. Also, the soft SIM TA 219 may include a soft SIM manager that manages a profile of a soft SIM and a soft SIM authentication module that manages authentication of the soft SIM. Also, each manager and/or module may be implemented with an independent TA. In this disclosure, an application that operates in the REE may be referred to as a "first application" (e.g., the roaming application 211), and an application that operates in the TEE may be referred to as a "second application" (e.g., the DRK TA 217, the soft SIM TA 219, or the like).

In an embodiment, one processor may drive an REE environment and a TEE environment. However, in another embodiment, the electronic device 200 may include a first processor and a second processor. In this case, the first processor may drive the REE environment, and the second processor may drive the TEE environment. That is, the REE and the TEE may be physically separated by hardware and may be logically classified by software.

The CP 220 may perform a cellular communication function between the electronic device 200 and a network. The CP 220 may be generally referred to as a "communication circuit". The CP 220 may directly communicate with the SIM 240 or the eSE 250 or may communicate with a network based on a command or information of the AP 210 transferred through the RIL 215.

Instructions, programmable code, and the like for executing operations to be performed in the electronic device 200 among embodiments disclosed in this disclosure may be stored in the memory 230. For example, data (a source file for execution of the roaming application 211, a user data file, and the like) associated with the roaming application 211 may be stored in the memory 230.

A partial area of the memory 230 may be specified as a secure area by the AP 210. For example, the AP 210 may specify the partial area of the memory 230 as a secure area that only the TEE is able to access. In an embodiment, the AP 210 may store a virtual SIM obtained from a roaming server in the secure area of the memory 230. In another embodiment, in the case where the electronic device 200 uses the eSE 250 as a storage space of the soft SIM, the virtual SIM may be stored in the eSE 250.

Figure 3:
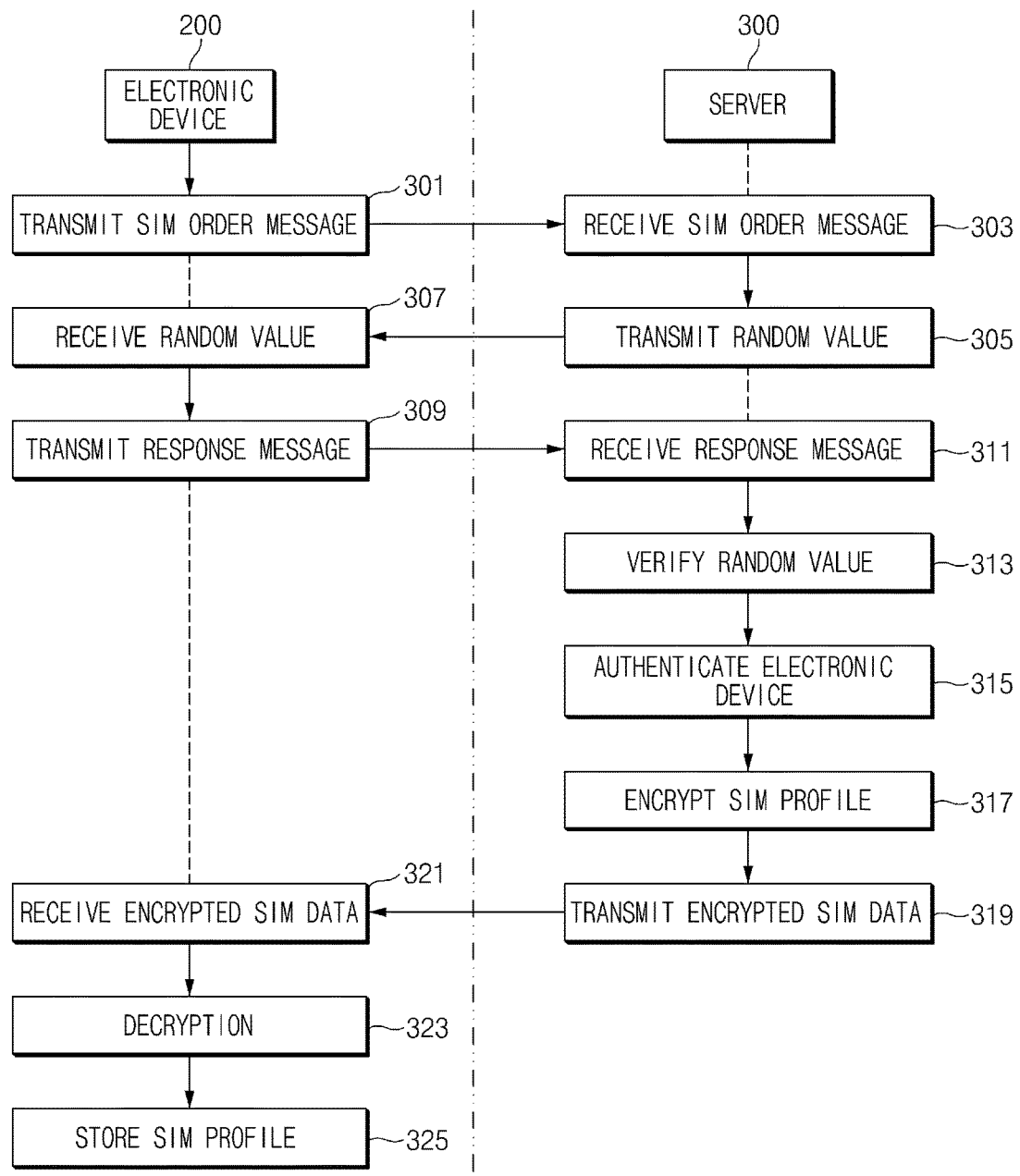
FIG. 3 is a diagram illustrating an example process of downloading and storing a SIM profile, according to an example embodiment.

FIG. 3 is a diagram illustrating an example process of downloading and storing a SIM profile, according to an example embodiment.

Referring to FIG. 3, in operation 301, the electronic device 200 may transmit a SIM order message to a server 300. The server 300 may correspond to a roaming server, a mobile virtual network operator (MVNO) server, a mobile network operator (MNO) server, or a combination thereof, which provides the electronic device 200 with a soft SIM (or virtual SIM).

In an embodiment, the electronic device 200 may execute the roaming application 211 and may transmit an order request for a roaming service product selected by a user input to the server 300. A country, expiration date, the amount of usage data, and any other user/device information corresponding to a roaming service product may be included in the order request (i.e., the SIM order message).

In operation 303, the server 300 may receive the SIM order message. In operation 305, the server 300 that receives the SIM order message may transmit a random value "nonce" to the electronic device 200 in response to the order message. The server 300 may transmit the random value to the electronic device 200 and may compare the transmitted random value with a value to be obtained later from the electronic device 200. According to the above-described challenge-response procedure, the server 300 may prevent a relay attack to steal and replay authentication information upon using a cookie or session.

For example, the electronic device 200 receives the random value in operation 307. In operation 309, the electronic device 200 may transmit a response message to the received random value. The response message may include the random value and a public key. Here, the public key may correspond to a public key that is generated by the second application (e.g., the DRK TA 217) and is provided to the SIM TA 219. Also, the public key may be included in the response message in the form of an encrypted certificate chain. A method of generating the response message will be exemplified with reference to FIG. 4.

In operation 311, the server 300 may receive the response message from the electronic device 200. In operation 313, the server 300 may obtain a first value included in the response message and may determine whether the first value is the same as the random value transmitted in operation 305. If the first value is the same as the random value, the server 300 may perform a process after operation 315. If the first value is not the same as the random value, the server 300 may determine that a replay attack occurs and may end the process. Below, a description will be given under the condition that the first value is the same as the random value.

In operation 315, the server 300 may authenticate the electronic device 200 based on information (e.g., a certificate chain) included in the response message. The server 300 may obtain a public key generated by the second application in the authentication process.

In operation 317, the server 300 may encrypt a SIM profile. The SIM profile may be defined by the SIM order message received in operation 303. For example, in the case where the user orders a product, which enables data communication for one week in Hong Kong, in an execution screen of the roaming application 211, the SIM profile may correspond to a SIM profile of a network operator that is usable in Hong Kong. That is, the SIM profile may include IMSI information corresponding to a country, a network operator, and user identification information. Additionally, the SIM profile may further include information about a validity period (e.g., an active-possible time and an expiration time) of a corresponding (soft) SIM. However, in an embodiment, information about the validity period of the SIM may have been registered at the server 300 (e.g., the MVNO or MNO server).

Encryption of the SIM profile in the server 300 may include the following operations. The server 300 may randomly generate a symmetric key every session. The server 300 may encrypt a SIM profile with the generated symmetric key. Also, the server 300 may encrypt the symmetric key with the public key obtained in operation 315.

In operation 319, the server 300 may transmit the encrypted SIM data to the electronic device 200. The SIM profile encrypted with the symmetric key and the symmetric key encrypted with the public key may be included in the encrypted SIM data.

In operation 321, the electronic device 200 may receive the encrypted SIM data. In operation 323, the electronic device 200 may decrypt the encrypted SIM data. For example, the electronic device 200 may provide SIM data obtained through the CP 220 to the soft SIM TA 219 through the RIL 215 and the soft SIM agent 213. The soft SIM TA 219 may decrypt the symmetric key encrypted with the public key by using a private key corresponding to a public key used when creating a certificate chain. If the soft SIM TA 219 obtains the symmetric key through the decryption, the soft SIM TA 219 may decrypt the SIM profile encrypted with the symmetric key.

In operation 323, the electronic device 200 may store the obtained SIM profile. The SIM profile may be stored in a secure memory area of the electronic device 200. For example, the soft SIM TA 219 may store the SIM profile in an area, which only the TEE accesses, of the memory 230 or the eSE 250. Also, when the electronic device 200 stores the SIM profile in the secure memory area, the electronic device 200 may encrypt and store the SIM profile by using a unique encryption algorithm of the TEE.

Figure 4:
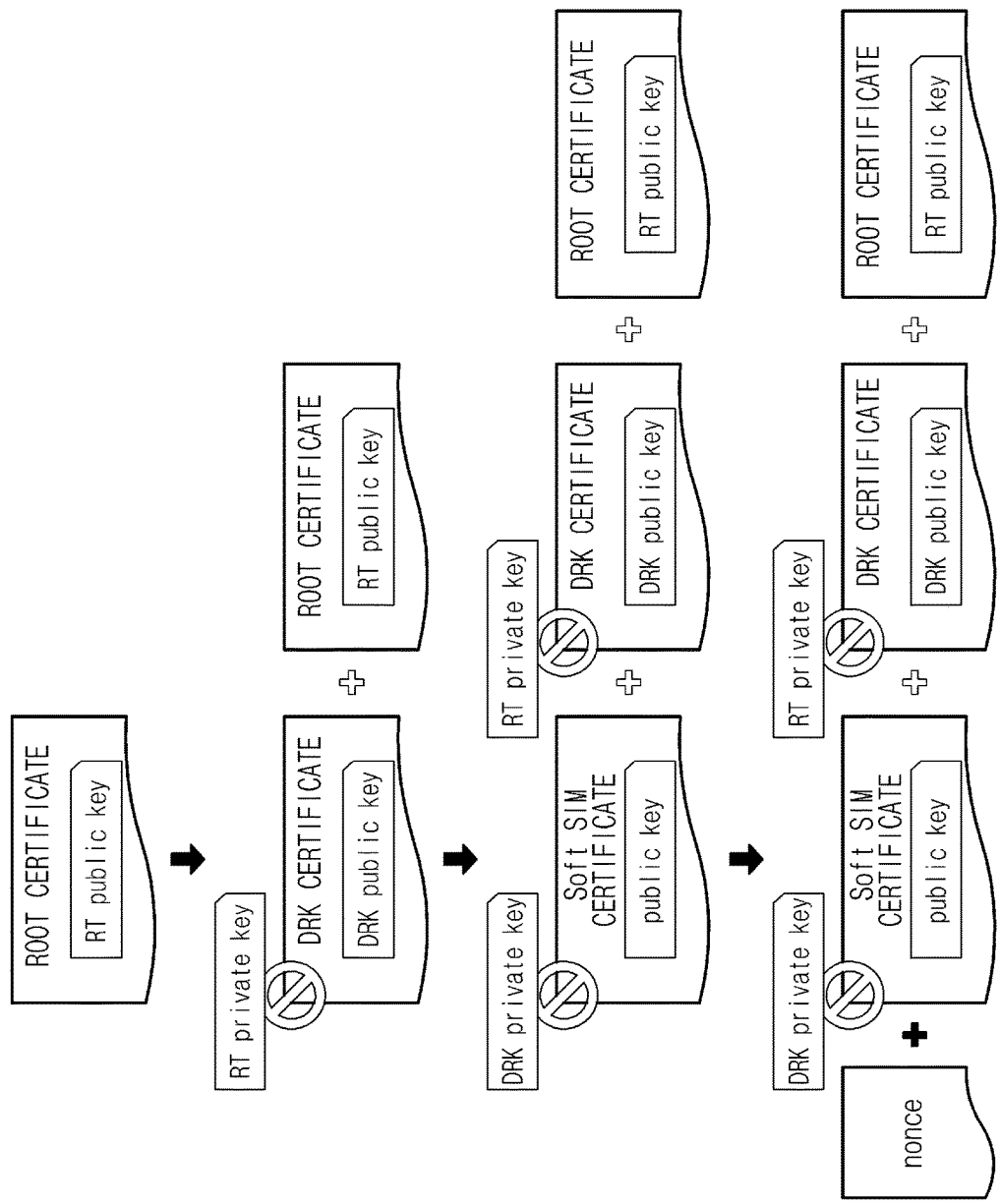
FIG. 4 is a diagram illustrating an example method of generating a response message, according to an example embodiment.

FIG. 4 is a diagram illustrating an example method of generating a response message, according to an example embodiment. A description given with reference to FIG. 4 may correspond, for example, to operation 309 of FIG. 3.

Referring to a first step and a second step of FIG. 4, the electronic device 200 may encrypt a DRK certificate with a private key of a root certificate. The DRK certificate may be generated by the DRK TA 217 and may include a DRK public key. A DRK private key may be managed by the DRK TA 217.

The soft SIM TA 219 may generate a soft SIM certificate including a public key. In an embodiment, the soft SIM certificate may correspond to an X.509 certificate complying with the ITU-T standard. For example, the soft SIM certificate may include a certificate version, a serial number, an algorithm identifier, a certificate issuer, a validity period, a public key, a public key algorithm, a certificate signature, and the like.

Referring to a third step of FIG. 4, the soft SIM certificate may be encrypted by the DRK private key. The soft SIM TA 219 may form a certificate chain by combing the encrypted soft SIM certificate, the encrypted DRK certificate, and the root certificate.

The certificate chain may be generated in a manner different from the manner described in FIG. 4. For example, the soft SIM TA 219 may generate the certificate chain by signing the soft SIM certificate with the DRK private key, adding the DRK certificate signed with the root certificate, and again adding the root certificate.

Referring to a fourth step of FIG. 4, the soft SIM TA 219 may generate a response message by adding the certificate chain to a random value received from the server 300. The generated response message may be transmitted to the server 300. The server 300 may determine whether a random value extracted from the response message is the same as a previously transmitted random value, may verify validity of the certificate chain, and may extract a public key from the soft SIM certificate.

Figure 5:
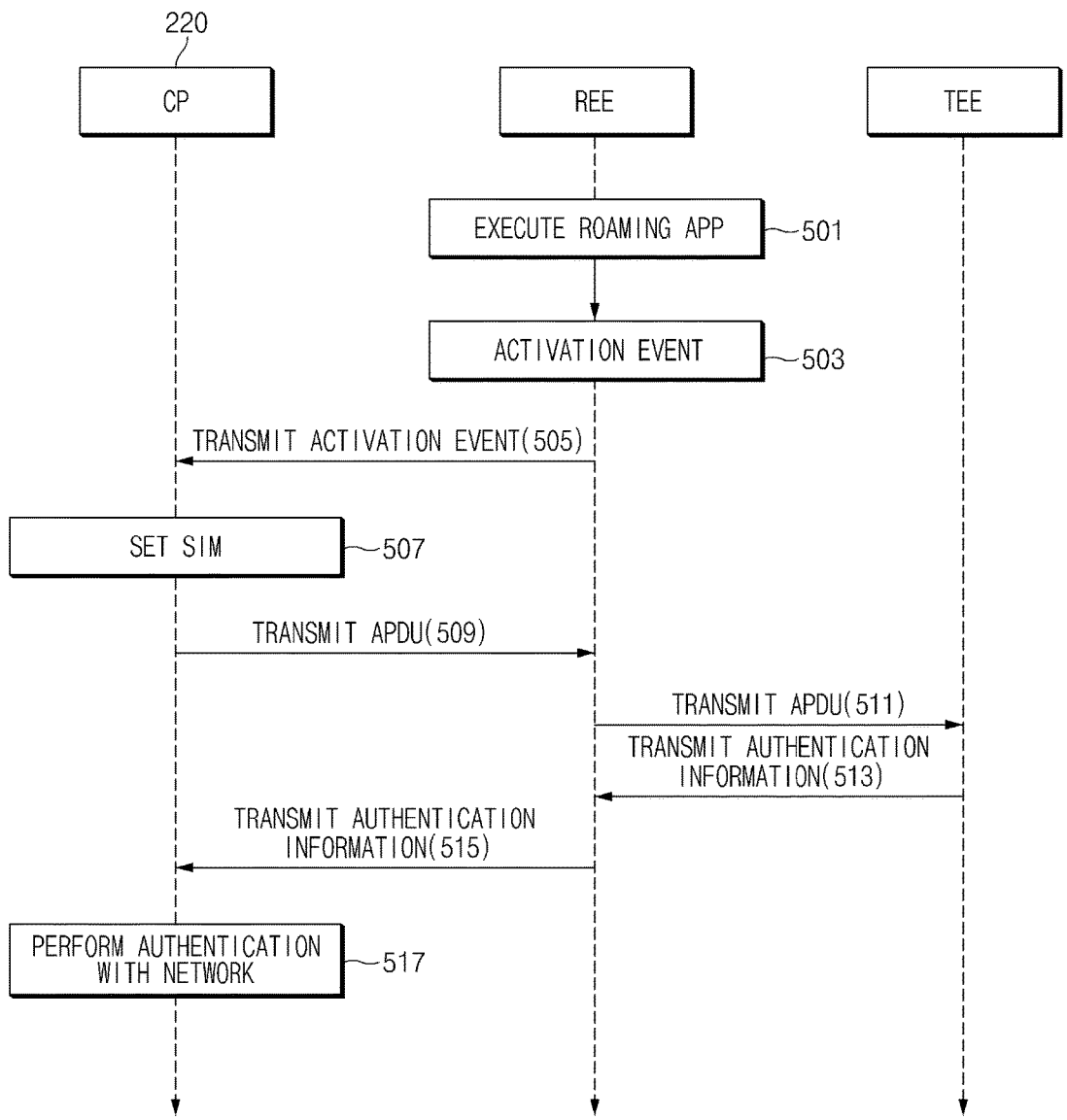
FIG. 5 is a diagram illustrating an example process of activating a soft SIM, according to an example embodiment.

FIG. 5 is a diagram illustrating an example process of activating a soft SIM, according to an example embodiment.

Referring to FIG. 5, in operation 501, the electronic device 200 may execute the roaming application 211. The roaming application 211 may be executed in the REE.

In operation 503, an activation event of a soft SIM may occur. For example, the user may provide a user input for replacing (mount of a virtual SIM) a currently activated SIM with the soft SIM. In the case where the electronic device 200 supports simultaneous activation of two or more SIMs, an event in which one of the two SIMs is deactivated and the soft SIM is activated in a slot corresponding to the deactivated SIM may occur.

If an activation event of the soft SIM occurs, the soft SIM agent 213 may switch the soft SIM into an active state and may transmit the activation event to the CP 220 through the RIL 215 in operation 505. If the CP 220 receives the activation event of the soft SIM, the CP 220 may set the soft SIM as a new SIM in operation 507 and may transmit an APDU message for progressing user authentication to the soft SIM agent 213 of the REE in operation 509. The soft SIM agent 213 may transmit the APDU to the soft SIM TA 219 in operation 511.

In operation 509, 511, 513 to operation 515, a secure channel for exchanging the APDU and authentication information may be established between the soft SIM TA 219 of the TEE, the soft SIM agent 213 of the REE, the RIL 215, and the CP 220. From a hardware point of view, messages may be exchanged by using the secure channel established between the AP 210 and the CP 220. For example, the AP 210 and the CP 220 may exchange encryption keys (e.g., a public key or symmetric key) at a previously defined time point such as a booting time point of the electronic device 200 and may encrypt and transmit a message transmitted to the secure channel with an encryption key. For example, if the CP 220 transmits an APDU message encrypted with a public key of the AP 210 to the AP 210 (e.g., the soft SIM TA 219 of the TEE), the AP 210 may perform decryption with one's own private key and may obtain the APDU message. If the AP 210 encrypts an IMSI value or the like with a public key of the CP 220 in response to the APDU message and transmits the encrypted result to the CP 220, the CP 220 may obtain the IMSI value by decrypting encrypted data with one's own private key.

In operation 517, the CP 220 may perform user authentication with a network based on authentication information (e.g., IMSI). Since the process after operation 517 complies with the procedure defined in the 3GPP standard, a detailed description of the process may be omitted in this disclosure.

Below, an user interface UI provided by the roaming application 211 when the process of FIG. 3 is performed will be exemplified with reference to FIGS. 6 and 7.

Figure 6:
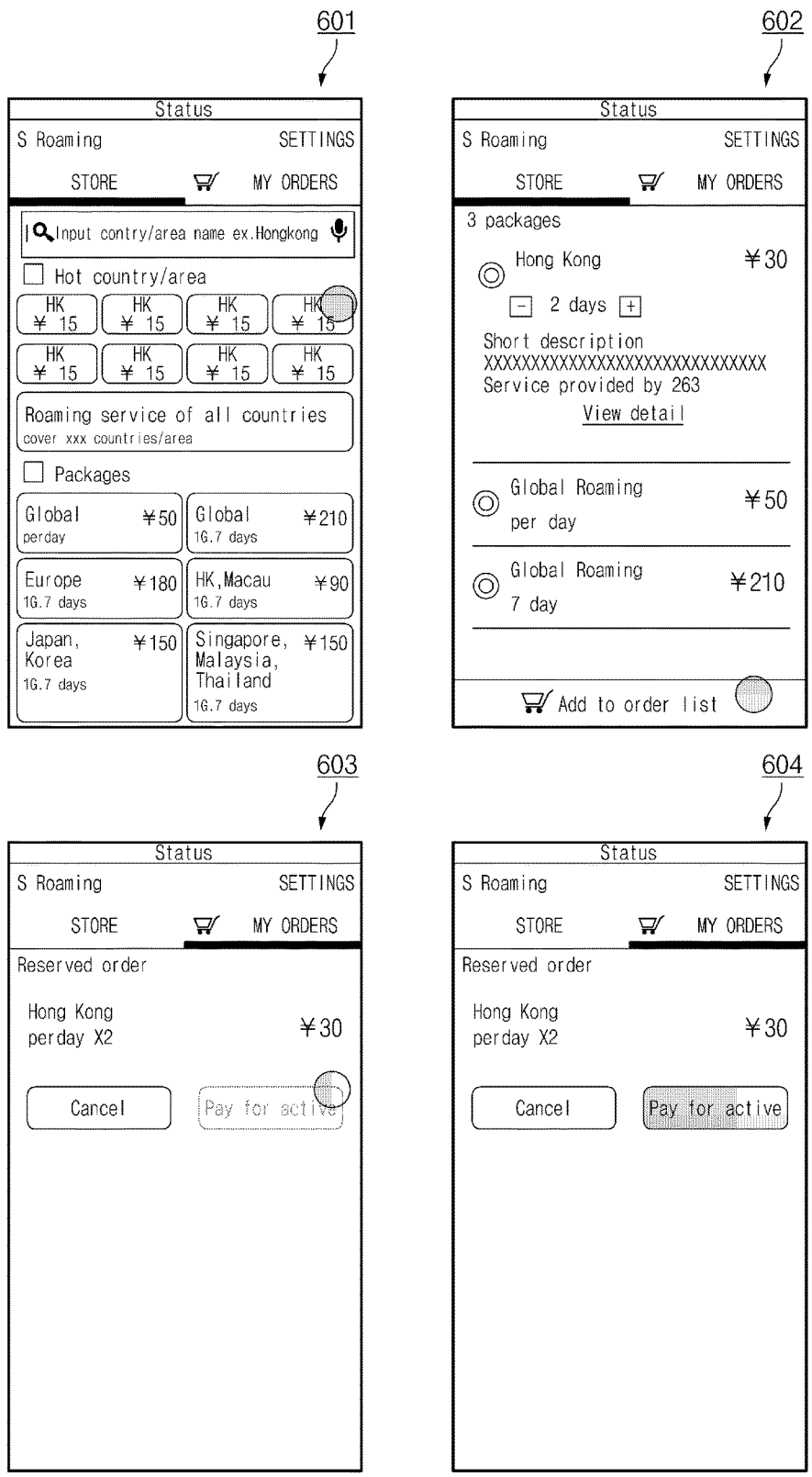
FIG. 6 is a diagram illustrating an example UI associated with a purchase of a roaming service product, according to an example embodiment.

FIG. 6 is a diagram illustrating an example UI associated with a purchase of a roaming service product, according to an example embodiment.

Referring to FIG. 6, a screen 601 illustrates a plurality of roaming service products available through the roaming application 211. For example, the screen 601 may be displayed in a display of the electronic device 200 when the roaming application 211 is executed.

The roaming service products may be arranged in the form of a recommended country or a recommended package. In an embodiment, the electronic device 200 may obtain schedule information of the user from another application (e.g., a calendar application) stored in the electronic device 200 or a user account server. The electronic device 200 may recommend a roaming service product appropriate for a country, which the user will visit, an area, a schedule of visit, and the like, based on the obtained schedule information.

A screen 602 illustrates a screen for adding a specific roaming service product to an order list. If an "ADD to order list" menu is selected in the screen 602, the electronic device 200 may perform an operation (e.g., operation 301 of FIG. 3) of transmitting a SIM order message to the server 300.

In an example embodiment, in the case where the user orders a roaming service product usable in a second country in a first country, as illustrated in a screen 603, a "pay for active" menu for activating the roaming service product may not be activated before the user moves to the second country. If the user moves to the second country, as illustrated in a screen 604, the "pay for active" menu may be activated. That is, the electronic device 200 may determine a country, in which the IMSI of the soft SIM is able to be activated, from the SIM profile obtained in operation 325 or the order information obtained in operation 301 and may determine whether to activate an active menu of the soft SIM based on location information of the electronic device 200.

Figure 7:
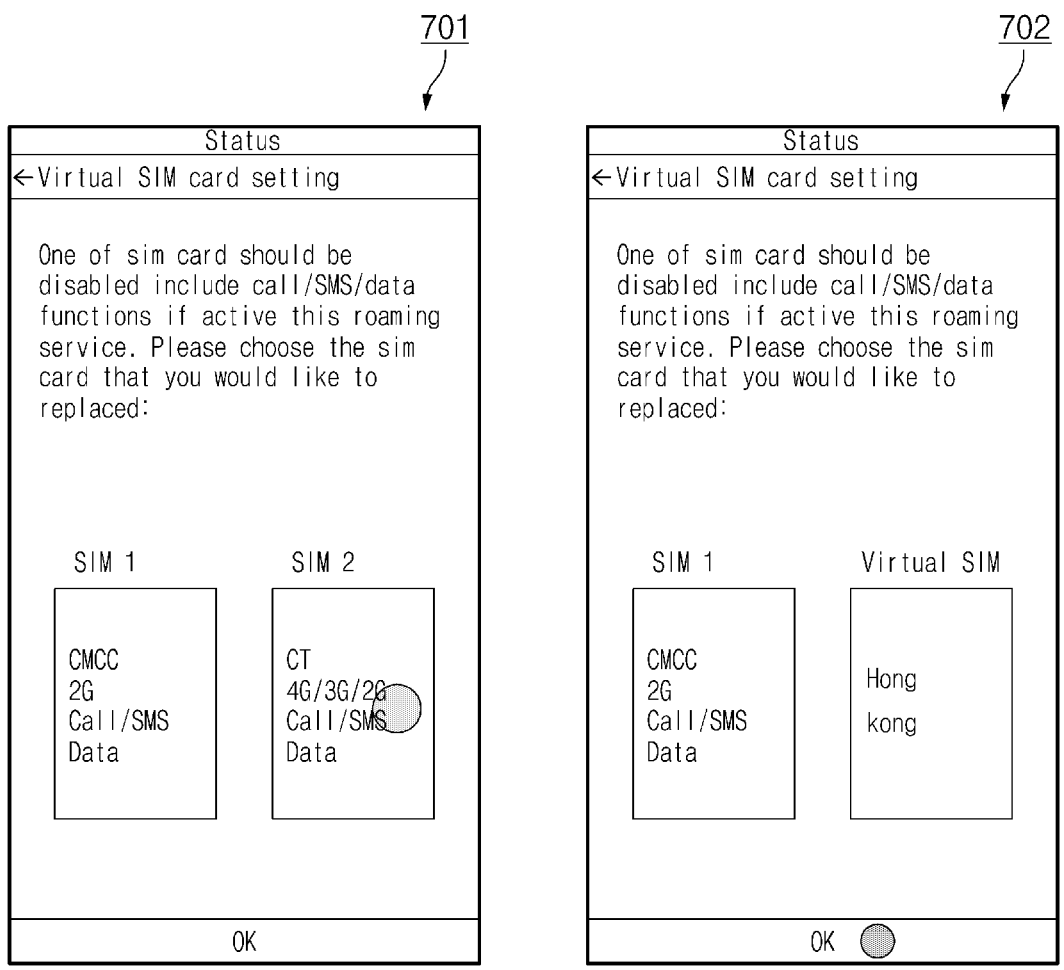
FIG. 7 is a diagram illustrating an example screen for selecting a SIM slot, according to an example embodiment.

FIG. 7 is a diagram illustrating an example screen for selecting a SIM slot, according to an example embodiment.

A screen 701 may be displayed in the case where the electronic device 200 activates two or more SIMs. For example, when a "pay for active" menu activated in an execution screen of the roaming application 211 is selected, the screen 701 may provide an UI for selecting a SIM slot on which a subscriber identification module corresponding to a purchased roaming service product is mounted. Since a subscriber identification module corresponding to the roaming service product is actually a virtual SIM (software SIM), not a physical SIM, the screen 701 may be understood as being a screen for selecting a SIM deactivated to use the virtual SIM.

For example, the screen 701 indicates a state in which a china mobile communications corporation (CMCC) SIM is activated in a first SIM slot SIM 1 and a china telecom (CT) SIM is activated in a second SIM slot SIM 2. The electronic device 200 may use a voice call and an SMS service through the SIM activated in the first SIM slot SIM 1 by using a 2G network of a CMCC operator. Also, the electronic device 200 may use a voice call/SMS service through the SIM activated in the second SIM slot SIM 2 by using a 4G network (data/voice) and a 2G/3G network of a CT operator. If the second SIM slot SIM 2 is selected by a user input or the like in the screen 701, the CMCC SIM may be kept in the first SIM slot SIM 1, and a second subscriber identification module purchased for use in Hong Kong may be activated in the second SIM slot SIM 2. For example, when the user is aboard, the user may use a voice call service based on a first subscriber identification module (e.g., CMCC SIM) and may use a data service based on the second subscriber identification module (e.g., Hong Kong virtual SIM) as illustrated in screen 702. In this case, a third subscriber identification module (e.g., CT SIM) replaced by the second subscriber identification module may be deactivated. In an embodiment, in the case where location information of the electronic device 200 does not correspond to the second subscriber identification module any more (e.g., the electronic device 200 is out of Hong Kong and moves to another country or the motherland), the electronic device 200 may automatically deactivate the second subscriber identification module and may again activate the third subscriber identification module.

Figure 8:
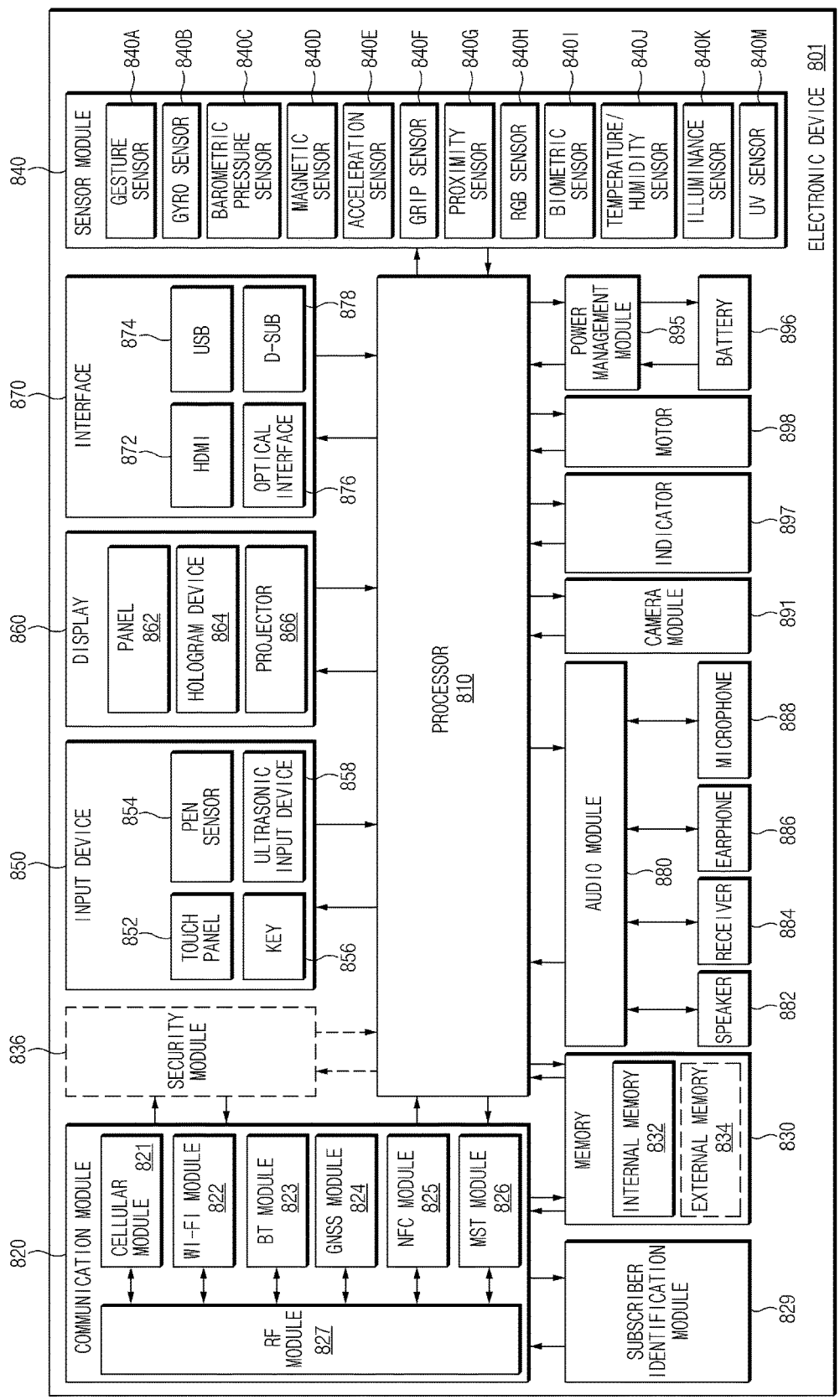
FIG. 8 is a block diagram illustrating an example electronic device, according to an example embodiment.

FIG. 8 is a block diagram of illustrating an example electronic device, according to an example embodiment.

Referring to FIG. 8, an electronic device 801 may include, for example, all or a part of the electronic device 101 illustrated in FIG. 1. The electronic device 801 may include one or more processors (e.g., an application processor (AP)) (e.g., including processing circuitry) 810, a communication module (e.g., including communication circuitry) 820, a subscriber identification module 829, a memory 830, a security module 836, a sensor module 840, an input device (e.g., including input circuitry) 850, a display 860, an interface (e.g., including interface circuitry) 870, an audio module 880, a camera module 891, a power management module 895, a battery 896, an indicator 897, and a motor 898.

The processor 810 may include various processing circuitry and drive, for example, an operating system (OS) or an application to control a plurality of hardware or software elements connected to the processor 810 and may process and compute a variety of data. For example, the processor 810 may be implemented with a System on Chip (SoC). According to an embodiment, the processor 810 may further include a graphic processing unit (GPU) and/or an image signal processor. The processor 810 may include at least a part (e.g., a cellular module 821) of elements illustrated in FIG. 8. The processor 810 may load an instruction or data, which is received from at least one of other elements (e.g., a nonvolatile memory), into a volatile memory and process the loaded instruction or data. The processor 810 may store a variety of data in the nonvolatile memory.

The communication module 820 may be configured the same as or similar to the communication interface 170 of FIG. 1. The communication module 820 may include various communication circuitry, such as, for example, and without limitation, the cellular module 821, a Wi-Fi module 822, a Bluetooth (BT) module 823, a GNSS module 824 (e.g., a GPS module, a Glonass module, a Beidou module, or a Galileo module), a near field communication (NFC) module 825, a MST module 826 and a radio frequency (RF) module 827.

The cellular module 821 may provide, for example, voice communication, video communication, a character service, an Internet service, or the like over a communication network. According to an embodiment, the cellular module 821 may perform discrimination and authentication of the electronic device 801 within a communication network by using the subscriber identification module (e.g., a SIM card) 829. According to an embodiment, the cellular module 821 may perform at least a portion of functions that the processor 810 provides. According to an embodiment, the cellular module 821 may include a communication processor (CP).

Each of the Wi-Fi module 822, the BT module 823, the GNSS module 824, the NFC module 825, or the MST module 826 may include a processor for processing data exchanged through a corresponding module, for example. According to an embodiment, at least a part (e.g., two or more) of the cellular module 821, the Wi-Fi module 822, the BT module 823, the GNSS module 824, the NFC module 825, or the MST module 826 may be included within one Integrated Circuit (IC) or an IC package.

For example, the RF module 827 may transmit and receive a communication signal (e.g., an RF signal). For example, the RF module 827 may include a transceiver, a power amplifier module (PAM), a frequency filter, a low noise amplifier (LNA), an antenna, or the like. According to another embodiment, at least one of the cellular module 821, the Wi-Fi module 822, the BT module 823, the GNSS module 824, the NFC module 825, or the MST module 826 may transmit and receive an RF signal through a separate RF module.

The subscriber identification module 829 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 830 (e.g., the memory 130) may include an internal memory 832 and/or an external memory 834. For example, the internal memory 832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 834 may be operatively and/or physically connected to the electronic device 801 through various interfaces.

A security module 836 may be a module including circuitry and a storage space of which a security level is higher than that of the memory 830 and may be a circuit that guarantees safe data storage and a protected execution environment. The security module 836 may be implemented with a separate circuit and may include a separate processor. For example, the security module 836 may be in a smart chip or a secure digital (SD) card, which is removable, or may include an embedded secure element (eSE) embedded in a fixed chip of the electronic device 801. Furthermore, the security module 836 may operate based on an operating system (OS) that is different from the OS of the electronic device 801. For example, the security module 836 may operate based on java card open platform (JCOP) OS.

The sensor module 840 may measure, for example, a physical quantity or may detect an operation state of the electronic device 801. The sensor module 840 may convert the measured or detected information to an electrical signal. For example, the sensor module 840 may include at least one of a gesture sensor 840A, a gyro sensor 840B, a barometric pressure sensor 840C, a magnetic sensor 840D, an acceleration sensor 840E, a grip sensor 840F, the proximity sensor 840G, a color sensor 840H (e.g., red, green, blue (RGB) sensor), a biometric sensor 840I, a temperature/humidity sensor 840J, an illuminance sensor 840K, and/or an UV sensor 840M. Although not illustrated, additionally or generally, the sensor module 840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor that is a part of the processor 810 or independent of the processor 810 and is configured to control the sensor module 840. The processor may control the sensor module 840 while the processor 810 remains at a sleep state.

The input device 850 may include various input circuitry, such as, for example, and without limitation, a touch panel 852, a (digital) pen sensor 854, a key 856, or an ultrasonic input unit 858. For example, the touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a part of a touch panel or may include an additional sheet for recognition. The key 856 may include, for example, a physical button, an optical key, a keypad, or the like. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 160) may include a panel 862, a hologram device 864, or a projector 866. The panel 862 may be the same as or similar to the display 160 illustrated in FIG. 1. The panel 862 may be implemented, for example, to be flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. For example, the screen may be arranged in the inside or the outside of the electronic device 801. According to an embodiment, the display 860 may further include a control circuit for controlling the panel 862, the hologram device 864, or the projector 866.

The interface 870 may include various interface circuitry, such as, for example, and without limitation, a high-definition multimedia interface (HDMI) 872, a universal serial bus (USB) 874, an optical interface 876, or a D-subminiature (D-sub) 878. The interface 870 may be included, for example, in the communication interface 170 illustrated in FIG. 1. Additionally or generally, the interface 870 may include, for example, a mobile high definition link (MI-IL) interface, a SD card/multi-media card (MMC) interface, or an infrared data association (IrDA) standard interface.

The audio module 880 may convert a sound and an electric signal in dual directions. At least a part of the audio module 880 may be included, for example, in the input/output interface 150 illustrated in FIG. 1. The audio module 880 may process, for example, sound information that is input or output through a speaker 882, a receiver 884, an earphone 886, or the microphone 888.

For example, the camera module 891 may shoot a still image or a video. According to an embodiment, the camera module 891 may include at least one or more image sensors (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC), a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate the following effects: vibration, haptic, and the like. Although not illustrated, a processing device (e.g., a GPU) for supporting a mobile TV may be included in the electronic device 801. The processing device for supporting the mobile TV may process media data according to the standards of digital multimedia broadcasting (DMB), digital video broadcasting (DVB), MediaFlo™, or the like.

Each of the above-mentioned elements of the electronic device according to various example embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 9:
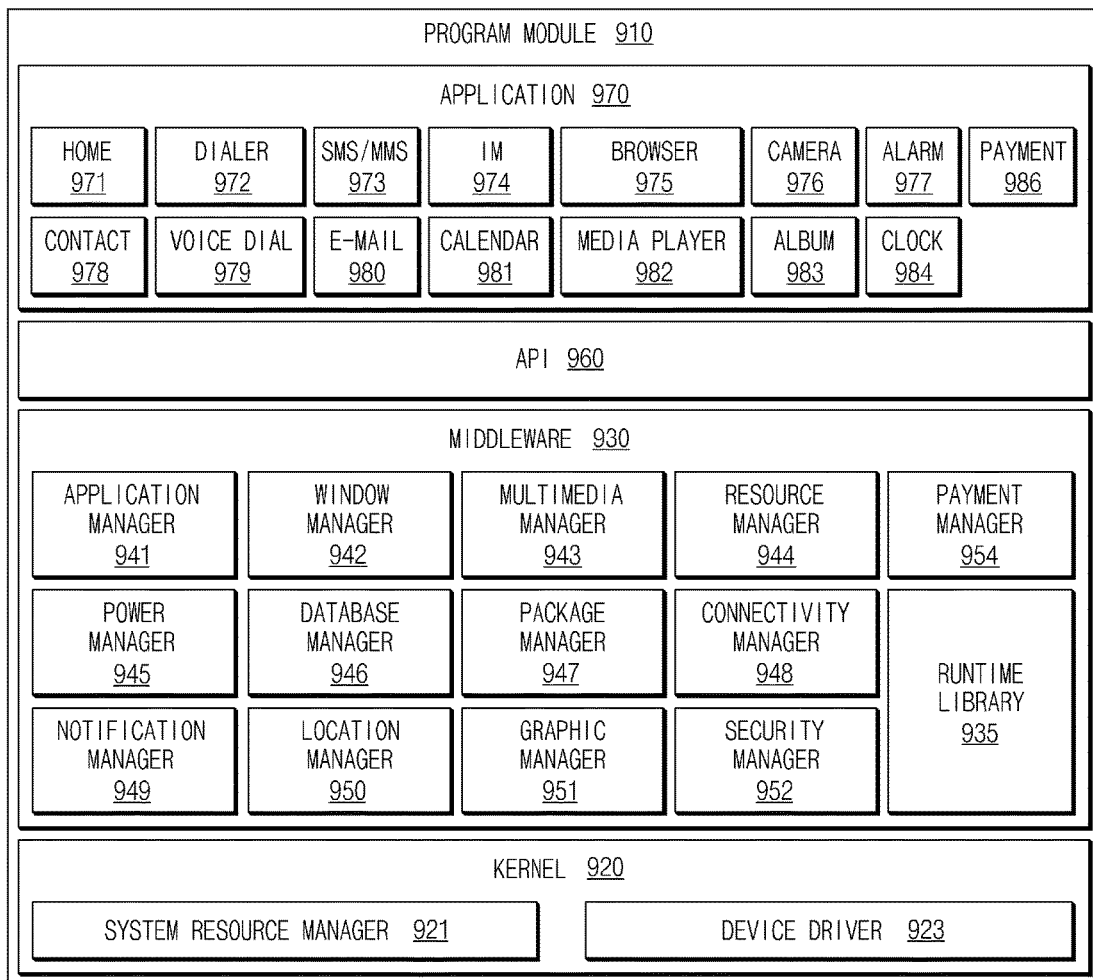
FIG. 9 is a block diagram illustrating an example program module, according to an example embodiment.

FIG. 9 is a block diagram illustrating an example program module, according to various example embodiments.

According to an embodiment, a program module 910 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, or Tizen.

The program module 910 may include a kernel 920, a middleware 930, an application programming interface (API) 960, and/or an application 970. At least a portion of the program module 910 may be preloaded on an electronic device or may be downloadable from an external electronic device (e.g., the first electronic device 102, the second electronic device 104, the server 106, or the like).

The kernel 920 (e.g., the kernel 141) may include, for example, a system resource manager 921 and/or a device driver 923. The system resource manager 921 may perform control, allocation, or retrieval of system resources. According to an embodiment, the system resource manager 921 may include a process managing unit, a memory managing unit, or a file system managing unit. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930 may provide, for example, a function that the application 970 needs in common, or may provide diverse functions to the application 970 through the API 960 to allow the application 970 to efficiently use limited system resources of the electronic device. According to an example embodiment, the middleware 930 (e.g., the middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, and/or a payment manager 954.

The runtime library 935 may include, for example, a library module that is used by a compiler to add a new function through a programming language while the application 970 is being executed. The runtime library 935 may perform input/output management, memory management, or capacities about arithmetic functions.

The application manager 941 may manage, for example, a life cycle of at least one application of the application 970. The window manager 942 may manage a graphic user interface (GUI) resource that is used in a screen. The multimedia manager 943 may identify a format necessary for playing diverse media files, and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage a battery or power, and may provide power information for an operation of an electronic device. The database manager 946 may generate, search for, or modify database that is to be used in at least one application of the application 970. The package manager 947 may install or update an application that is distributed in the form of package file.

The connectivity manager 948 may manage, for example, wireless connection such as Wi-Fi or Bluetooth. The notification manager 949 may display or notify an event such as arrival message, appointment, or proximity notification in a mode that does not disturb a user. The location manager 950 may manage location information about an electronic device. The graphic manager 951 may manage a graphic effect that is provided to a user, or manage a user interface relevant thereto. The security manager 952 may provide a general security function necessary for system security, user authentication, or the like. According to an embodiment, in the case where an electronic device (e.g., the electronic device 101) includes a telephony function, the middleware 930 may further include a telephony manager for managing a voice or video call function of the electronic device.

The middleware 930 may include a middleware module that combines diverse functions of the above-described elements. The middleware 930 may provide a module specialized to each OS kind to provide differentiated functions. Additionally, the middleware 930 may dynamically remove a part of the preexisting elements or may add new elements thereto.

The API 960 (e.g., the API 145) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 970 (e.g., the application program 147) may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a clock 984, and/or a payment 985 or for offering health care (e.g., measuring an exercise quantity, blood sugar, or the like) or environment information (e.g., information of barometric pressure, humidity, temperature, or the like).

According to an embodiment, the application 970 may include an application (hereinafter referred to as "information exchanging application" for descriptive convenience) to support information exchange between an electronic device (e.g., the electronic device 101) and an external electronic device (e.g., the first electronic device 102 or the second electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 970 may include an application (e.g., a health care application of a mobile medical device) that is assigned in accordance with an attribute of an external electronic device. According to an embodiment, the application 970 may include an application that is received from an external electronic device (e.g., the first electronic device 102, the second electronic device 104, or the server 106). According to an embodiment, the application 970 may include a preloaded application or a third party application that is downloadable from a server. The names of elements of the program module 910 according to the embodiment may be modifiable depending on kinds of operating systems.

According to various embodiments, at least a portion of the program module 910 may be implemented by software, firmware, hardware, or a combination of two or more thereof. At least a portion of the program module 910 may be implemented (e.g., executed), for example, by the processor (e.g., the processor 810). At least a portion of the program module 910 may include, for example, modules, programs, routines, sets of instructions, processes, or the like for performing one or more functions.

The term "module" used herein may refer, for example, to a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various example embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments disclosed in this disclosure, it may be possible to secure a high-level security when downloading and storing a SIM profile through a network.

Also, it may be possible to prevent leakage of significant authentication information, such as IMSI or Ki, by a replay attack of a malicious user.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device configured to support a rich execution environment (REE) and a trusted execution environment (TEE) independent of the REE, the electronic device comprising:
at least one processor configured to execute a first application in the REE, to execute a second application in the TEE, and to execute an agent that performs data transmission between the first application and the second application;
a communication circuit configured to communicate with a server; and
a secure memory area accessible by the TEE,
wherein the at least one processor is configured to:
obtain a random value from the server in response to transmission of a SIM order message through the first application;
transmit a response message, including the random value and a public key generated by the second application, to the server through the communication circuit;
receive encrypted SIM data from the server;
obtain a SIM profile from the encrypted SIM data using a private key generated by the second application and corresponding to the public key; and
store the obtained SIM profile in the secure memory area.

2. The electronic device of claim 1, further comprising:
a display comprising a touch screen panel,
wherein the at least one processor is configured to display an execution screen of the first application on the display,
wherein the execution screen includes a plurality of roaming service products, and
wherein the at least one processor is configured to transmit the SIM order message associated with a roaming service product selected through the touch screen panel to the server through the communication circuit.

3. The electronic device of claim 1, wherein the at least one processor is configured to generate the response message including the random value and a certificate chain, and
wherein the certificate chain comprises a first certificate including the public key and at least one additional certificate.

4. The electronic device of claim 3, wherein the at least one processor is configured to generate a root certificate comprising a root public key, a second certificate encrypted with a root private key corresponding to the root public key and including a DRK public key, the first certificate encrypted with a DRK private key corresponding to the DRK public key, and the random value.

5. The electronic device of claim 1, wherein the encrypted SIM data includes a SIM profile encrypted with a symmetric key generated in the server and the symmetric key encrypted with the public key, and
wherein the at least one processor is configured to:
obtain the symmetric key by decrypting the encrypted symmetric key with the private key corresponding to the public key; and
decrypt the encrypted SIM profile with the symmetric key.

6. The electronic device of claim 5, wherein the at least one processor is configured to:
encrypt the SIM profile using the second application; and
store the encrypted SIM profile in the secure memory area.

7. The electronic device of claim 1, wherein the at least one processor is configured to:
transmit an event to the second application through the agent, if the event in which the SIM profile is activated in the first application and
wherein the communication circuit is configured to communicate with a network based on the activated SIM profile.

8. The electronic device of claim 7, wherein the communication circuit is configured to:
receive information of the SIM profile from the second application through a secure channel.

9. The electronic device of claim 1, wherein the secure memory area corresponds to a storage space of an embedded secure element (eSE).

10. The electronic device of claim 1, wherein the at least one processor comprises a first processor and a second processor, wherein the first processor is configured to execute the first application in the REE, and wherein the second processor is configured to execute the second application in the TEE.

11. A method of managing a SIM of an electronic device that supports a rich execution environment (REE) and a trusted execution environment (TEE) independent of the REE, the method comprising:

transmitting a SIM order message to a server through a first application executed in the REE;

obtaining a random value from the server in response to the transmission of the SIM order message;

transmitting a response message including the random value and a public key, generated by a second application executed in the TEE, to the server;

receiving encrypted SIM data from the server;

obtaining a SIM profile from the encrypted SIM data with a private key generated by the second application corresponding to the public key; and storing the obtained SIM profile in a secure memory area that is accessible by the TEE.

12. The method of claim 11, wherein the transmitting of the response message includes:

generating a response message including the random value and a certificate chain.

13. The method of claim 12, wherein the transmitting of the response message includes:

encrypting a first certificate including a DRK public key with a root private key;

encrypting a second certificate, including the public key generated by the second application, with a DRK private key corresponding to the DRK public key; and generating a response message including the random value, the encrypted second certificate, and a root certificate including a root public key corresponding to the root private key.

14. The method of claim 11, wherein the obtaining of the SIM profile includes:

obtaining a SIM profile encrypted with a symmetric key generated in the server and the symmetric key encrypted with the public key from the encrypted SIM data;

obtaining the symmetric key by decrypting the symmetric key encrypted with the private key corresponding to the public key; and decrypting the encrypted SIM profile with the symmetric key.

15. The method of claim 11, further comprising:

encrypting, using a second application, the obtained SIM profile and storing the encrypted SIM profile in the secure memory area.

* * * * *